United States Patent Office 3,848,038
Patented Nov. 12, 1974

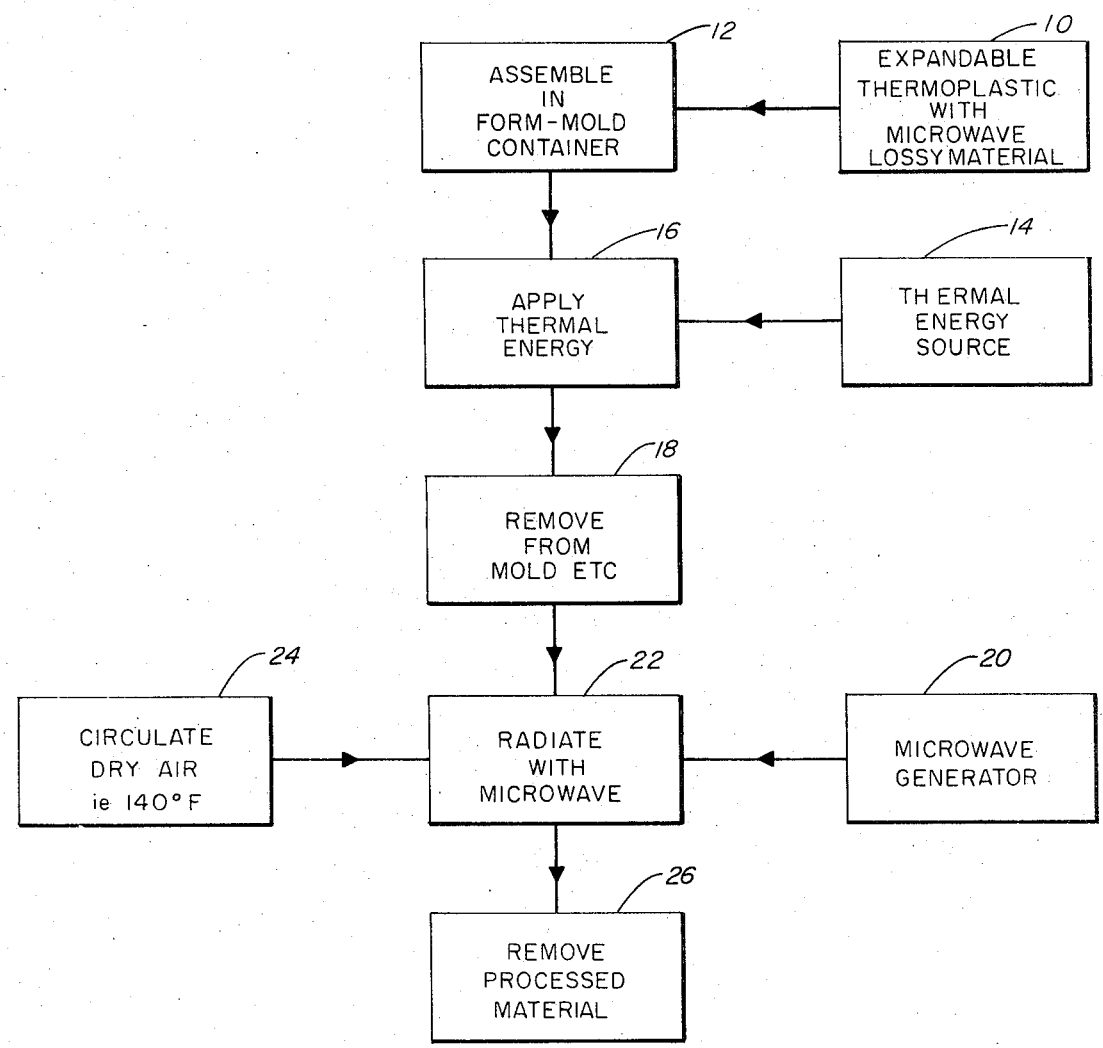

3,848,038
DRYING EXPANDED PLASTIC WITH MICROWAVE ENERGY
Edward C. Dench, Annisquam, Mass., assignor to Raytheon Company, Lexington, Mass.
Filed June 4, 1973, Ser. No. 366,959
Int. Cl. B29c *19/02;* B29h *5/26;* H05b *9/06*
U.S. Cl. 264—51                                  1 Claim

ABSTRACT OF THE DISCLOSURE

A composition for expandable plastic material, such as polystyrene, for processing by microwave energy having a microwave lossy additive material is disclosed selected from the group including carbon, graphite, magnetite, ferrites or barium titanate. A method is also disclosed for processing expandable plastic material utilizing microwave energy.

BACKGROUND OF THE INVENTION

(1) Field of the Invention

The invention relates to a composition for expandable plastics and processing such materials utilizing microwave energy.

(2) Description of the Prior Art

The processing of nonconductors or poor thermally conductive materials such as foodstuffs, paper, wood, leather or refractory materials have been improved in recent years with the application of nonradiant heat such as that generated by electromagnetic energy sources operating in the microwave end of the electromagnetic spectrum. Such energy generators include magnetrons, as well as klystrons and vacuum tube oscillators. The frequencies are allocated by governmental regulatory bodies and typically are 915±13 and 2450±50 mHz. The term "microwave" is defined for the purpose of the present specification as electromagnetic energy radiation having wavelengths in the order of 1 meter to 1 millimeter and frequencies in the range of 300 mHz. to 300 gHz.

Molded foam products utilizing expandable plastic materials such as polystyrene involve chemical reactions in the presence of heat and as the product expands the dielectric constant and loss characteristics vary. This phenomena must be considered in processing operations involving oscillating microwave energy. Typically, the power absorbed by the material being processed is proportional to the square of the strength of the electric field produced by the electromagnetic oscillator, the dielectric constant of the material, the frequency employed and the loss factor. Since the frequencies are specifically allocated, the degree to which the material may be processed by microwave energy becomes critically dependent on the dielectric constant and the loss factors. Any substance which readily absorbs microwave energy is termed "lossy." All the factors which are relevant to the microwave heating art in terms of total energy required to heat a specific load may be expressed by the equation:

$$W = AfE^2[E1/E_o \tan \delta] \times 10^{-12}$$

where: W is the energy density; A is a constant having a value of 1.4; $f$ is the frequency of the field; E is the alternating electrical field within the material, and $E1/E_o$ tangent $\delta$ is loss factor. Due to the nonuniformity of selected masses it is difficult in numerous applications to obtain uniform heating of the mass. It is, therefore, advantageous to add certain lossy materials to assist in the absorption in the microwave energy.

In the field of expandable plastic material, beads, such as polystyrene, are conventionally placed in a container or a mold and subjected to heat, usually steam, to cause the material to expand and adhere together to form a polystyrene foam. The foamed plastic material in billet form is readily sliced into boards or other shapes by means of cutting with a hot electric wire. Such products are utilized for thermal insulation, roofing, floats, and the like. A second type of expanded plastic material is utilized in packaging containers for expensive or delicate instruments having specific shapes conforming to that of the product. Decorations, such as intricate Christmas ornaments also fall in this category, as well as buoys for boats and the like.

Another application for expandable plastic materials is the area of investment castings where a low loss material such as polystyrene is molded in a full mold and after the molded shape has been obtained the object is encased in sand or other refractory molding material. A slurry of a hot metal is then cast directly into the mold displacing the polystyrene which burns off.

In the case of the steam process for expanding the material a certain amount of residual interstitial moisture remains, illustratively, approximately 2% by weight. This moisture must be removed before the foamed plastic can be utilized in view of the disadvantages in the processing techniques for the described products utilizing polystyrene material. In the applications where hot wire cutting is involved the residual moisture creates problems due to voids in the material. In the applications where complicated molded foamed shapes are involved the material package may suffer the effect of corrosion due to the residual moisture. Finally, the presence of such moisture in the material can cause blowing or voids in metal castings. In the past, the removal of any moisture from the foamed plastic material has been difficult and it is common practice in the industry to allow such material to be stored in a dry stabilizing atmosphere for periods of up to two weeks.

The use of microwave energy in the processing of poor thermally conductive materials has been disclosed in the patent issued to E. C. Dench, Pat. No. 3,519,517, issued July 7, 1970, and assigned to the assignee of the present invention. In the preparation of products having predominantly a granular refractory content it is disclosed that the addition of certain lossy materials having high microwave energy absorbing characteristics will permit substantial reduction in the curing time of said core molds and the like. Such energy absorbing materials include carbonaceous products, molybdenum, tungsten and a barium titanate in quantities of up to 4% by weight. Such energy absorbing materials are advantageously mixed in with the resin and said at the time of the preparation of the core mixes.

Since expanded foamed plastic materials are typically white in appearance the addition of such materials as carbon, graphite and carbon black create certain problems in the reduction to practice in first of all obtaining an efficient mixing with, for example, polystyrene beads, as well as, the dust problem in the storage and application of the additive materials. The discolorations resulting from the addition of such lossy materials also have resulted in adverse effects in attempting to process and, more specifically, drying expanded foamed plastic materials. The dielectric constant characteristics and loss tangent factors of the expanded plastic material typically change rapidly from the initial mixed state to the expanded foamed end product. In this initial state the application of microwave energy for curing may result in too rapid curing without the desired volume expansion of the foam. It is, however, desirable at a later state of the processing operation to introduce the application of microwave energy to create a temperature gradiant causing a diffusion of residual moisture when the foamed product is ideally transparent to microwave energy to thereby release the residual moisture without scorching or otherwise damaging the foamed plastic product. The wide dispersal of the small amount of residual moisture, however, reduces efficiency.

SUMMARY OF THE INVENTION

In accordance with the present invention a composition for an expandable plastic material is disclosed including a microwave lossy additive material selected from the group including carbon, graphite, magnetite, ferrites or barium titanate. The microwave lossy material is introduced into the composition either among the plastic beads prior to thermal expansion or in the beads, illustratively, polystyrene, at the time of their initial fabrication. The invention further comprises the method of removing substantial amounts of interstitial moisture in expanded foam material, principally of a polystyrene composition comprising the steps of:

(1) Assembling a plurality of plastic expandable beads having a microwave lossy additive material in a mold or container;
(2) Application of thermal energy from a conventional thermal source, i.e. steam;
(3) Removal of expanded plastic from mold or container;
(4) Application of microwave energy from a microwave energy source to radiate the expanded material for a period of time sufficient to substantially diffuse residual interstitial moisture to the surface; and
(5) Removal of the surface moisture by means, illustratively, of circulation of dry air at a temperature of approximately 140° F.

In the case of billet or molded products having desirably a white color the microwave lossy additive material would be barium titanate. Carbon and other suggested materials may be utilized where color is not of paramount consideration.

DESCRIPTION OF THE PREFERRED EMBODIMENT

Referring to the figure, the invention will now be described. The first step comprises the mixing of the polystyrene expandable plastic material with an appropriate amount of the microwave lossy additive material of the carbonaceous or other previously noted composition as indicated by box 10. In those instances where the polystyrene beads include the microwave lossy material the first mixing step may be omitted.

Next, the expandable material is processed by assembly in the mold or container to achieve the desired expanded shape. This step is indicated by the numeral 12. Thermal energy, illustratively steam, is supplied by a thermal energy source 14 which is applied to the material within the form, mold or container indicated at 16.

After the product has expanded to the volume desired the foamed plastic object is removed as indicated by step 18.

Next, microwave energy from a source such as a magnetron 20 is supplied using a microwave applicator apparatus as indicated in the aforementioned Dench patent. The microwave energy radiation step 22 proceeds for a time sufficient to cause the residual moisture to diffuse the surface. During the microwave radiation step means for the removal of any residual moisture reaching the surface are utilized such as circulating driy air at a temperature, illustratively 140° F. as indicated by box 24 does simultaneously utilize it. The apparatus for the circulation of the drying medium may be fed by conventional means in the microwave heating apparatus of the type shown in the reference Dench patent and have not been further elaborated or herein as being within the general knowledge of the skilled artisans.

Finally, the processing is concluded by step 26 comprising the removal of the dried expanded foam plastic material.

A unique and novel method of processing expanded plastic materials utilizing microwave energy as well as a composition for such plastic material incorporating a microwave lossy additive material has measurably advanced the removal of any residual moisture in such materials by reducing the amount of time required for the drying operation. The additive materials have enhanced the efficiency of the overall drying operation of the microwave transparent material in its foam state. Variations, modifications and alterations will be evident to those skilled in the art and it is intended, therefore, that the foregoing description of the invention be considered broadly and not in a limiting sense.

What is claimed is:

1. A method of processing expandable plastic material principally of a polystyrene composition comprising the steps of:

mixing microwave energy absorbing material selected from the group including carbon, graphite, magnetite, barium titanate and lossy ferrites with said plastic material;
placing said mixed plastic and additive materials in a mold to provide the desired expanded object configuration;
heating said mold by a moisture laden atmosphere to cause expansion of said material within said mold;
removal of said expanded foamed plastic material object from said mold;
radiating said removed expanded foamed plastic material object with microwave energy a sufficient time to diffuse residual interstitial moisture to the surface; and
simultaneously circulating a drying medium over said object to remove substantially all of the surfaced moisture.

References Cited
UNITED STATES PATENTS

| | | | |
|---|---|---|---|
| 3,640,913 | 2/1972 | Cerra | 264—26 |
| 3,519,517 | 7/1970 | Dench | 264—26 |
| 3,331,899 | 7/1967 | Immel | 264—26 |
| 3,253,064 | 5/1966 | Buonaiuto | 264—26 |
| 3,755,517 | 8/1973 | Clancy et al. | 264—321 |
| 2,998,501 | 8/1961 | Edberg et al. | 264—26 |
| 3,060,513 | 10/1962 | Klink et al. | 264—26 |
| 3,511,899 | 5/1970 | Miller et al. | 264—26 |

RONALD W. GRIFFIN, Primary Examiner

U.S. Cl. X.R.
264—26, Dig. 17